United States Patent
Wu et al.

(10) Patent No.: US 8,010,770 B2
(45) Date of Patent: Aug. 30, 2011

(54) CACHING DEVICE FOR NAND FLASH TRANSLATION LAYER

(75) Inventors: Chin-hsien Wu, Taipei (TW); Tei-wei Kuo, Taipei (TW); Hsiang-Chi Hsieh, Sindian (TW)

(73) Assignee: Genesys Logic, Inc., Taipei (TW)

( * ) Notice: Subject to any disclaimer, the term of this patent is extended or adjusted under 35 U.S.C. 154(b) by 670 days.

(21) Appl. No.: 11/841,434

(22) Filed: Aug. 20, 2007

(65) Prior Publication Data

US 2008/0162792 A1 Jul. 3, 2008

(30) Foreign Application Priority Data

Dec. 27, 2006 (TW) ............................... 95222905 U

(51) Int. Cl.
*G06F 12/00* (2006.01)
*G06F 13/00* (2006.01)
*G06F 13/28* (2006.01)

(52) U.S. Cl. ....................................................... 711/207
(58) Field of Classification Search .................. 711/207
See application file for complete search history.

(56) References Cited

U.S. PATENT DOCUMENTS

| 6,115,547 A * | 9/2000 | Ghatate et al. .................. 703/13 |
| 2004/0186946 A1* | 9/2004 | Lee ............................... 711/103 |
| 2005/0149896 A1* | 7/2005 | Madurawe ...................... 716/17 |

FOREIGN PATENT DOCUMENTS

| TW | 1249670 | 2/2006 |
| TW | 1253564 | 4/2006 |

* cited by examiner

*Primary Examiner* — Kevin Ellis
*Assistant Examiner* — Chad L Davidson

(57) ABSTRACT

A caching device is positioned between a memory read/write controller and a flash memory, which contains an instruction register, a logical address register, a data register, a pair of auxiliary controllers, a microprocessor, an address translation unit, a flash memory address register, a caching control unit, and a caching instruction and data buffer area. Among them, the microprocessor is the core of the caching device responsible not only for the reading and writing the flash memory but also for the caching operation for logical and physical address translation. The caching control unit is a programmable device containing the instruction and data for caching the logical and physical address mapping. The caching instruction and data buffer area temporarily stores the caching instruction and data used by the caching control unit.

15 Claims, 5 Drawing Sheets

CACHING DEVICE FOR NAND FLASH TRANSLATION LAYER

BACKGROUND OF THE INVENTION

1. Field of the Invention

The present invention generally relates to the management of NAND flash memory, and more particularly to a caching device for NAND flash translation layer of the NAND flash memory.

2. The Prior Arts

Flash memories are commonly found in computers and consumer electronic products. For example, USB disks and MP3 players are the two most common applications of the flash memories. Among various types of flash memories, the NAND flash memories are commonly found in embedded systems. A NAND flash memory is organized into fixed-size pages (for example 512 bytes per page) and a number of pages constitute a block (for example 32 pages per block). A characteristic of the NAND flash memory is that two pages of the same block cannot be written simultaneously unless that block is erased first. Such an access characteristic of the NAND flash memory presents a difficulty in its management.

To make a NAND flash memory to work under an existing file system and format (such as FAT16/32, NTFS, EXT2, etc.), the most frequently adopted approach is to maintain an address translation table mapping logical addresses to physical addresses of the NAND flash memory. As such, the NAND flash memory can be simulated into a continuous memory space and, without altering the existing file system and format, the NAND flash memory can be treated as, for example, a hard disk. This approach is referred to as the NAND flash translation layer.

As the capacity of the NAND flash memory is increased, the NAND flash translation layer uses a block-level mapping mechanism to reduce RAM (Random Access Memory) space required to maintain the address translation table. However, the block-level mapping is inefficient in mapping logical addresses to the physical flash memory addresses. This is because the flash memory is read or written in units of pages but to obtain a new page address, under the block-level mapping, the pages in a block has to be searched which takes some time. As such, the efficiency and speed in reading and writing the NAND flash memory are affected.

In the prior arts, for example, Taiwan Patent Publication Nos. I253564 and I249670 teach a typical flash memory address translation technique, a management method of good and bad blocks, and a method and technique for sequentially writing data into the flash memory from virtual blocks. These teachings also require mapping logical addresses to physical flash memory addresses in accessing data, and suffer the same inefficient problem.

SUMMARY OF THE INVENTION

Accordingly, the present invention provides a space-efficient caching mechanism for the NAND flash translation layer so as to increase the efficiency of mapping logical addresses to physical flash memory addresses.

An objective of the present invention is to provide a caching device for the NAND flash translation layer between a memory read/write controller and a flash memory so as to speed up the read and write accesses to the flash memory.

Another objective of the present invention is to provide a caching device for the NAND flash translation layer containing a caching control unit and a caching instruction and data buffer area so that caching instructions and data for the caching of the logical and corresponding physical addresses can be programmed and stored.

To achieve the foregoing objectives, the present invention provides a caching device that is positioned between a memory read/write controller and a flash memory, and which contains an instruction register, a logical address register, a data register, a pair of auxiliary controllers, a microprocessor, an address translation unit, a flash memory address register, a caching control unit, and a caching instruction and data buffer area. Among them, the instruction register, logical address register, data register, and an auxiliary controller jointly interface the memory read/write controller with the microprocessor, which is the core of the caching device responsible not only for the reading and writing the flash memory but also for the caching operation for logical and physical address translation. The address translation unit provides a conventional block-level mapping mechanism. The flash memory address register interfaces the address translation unit and the other auxiliary controller with the flash memory for temporarily storing the physical address in accessing the flash memory. The caching control unit is a programmable device containing the instruction and data for caching the logical and physical address mapping. The caching instructions are fed into the microprocessor for execution and the obtained physical addresses are fed into the flash memory address register. The caching instruction and data buffer area connects the caching control unit for temporarily storing the caching instruction and data used by the caching control unit.

The foregoing and other objects, features, aspects and advantages of the present invention will become better understood from a careful reading of a detailed description provided hereinafter with appropriate reference to the accompanying drawings, wherein:

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
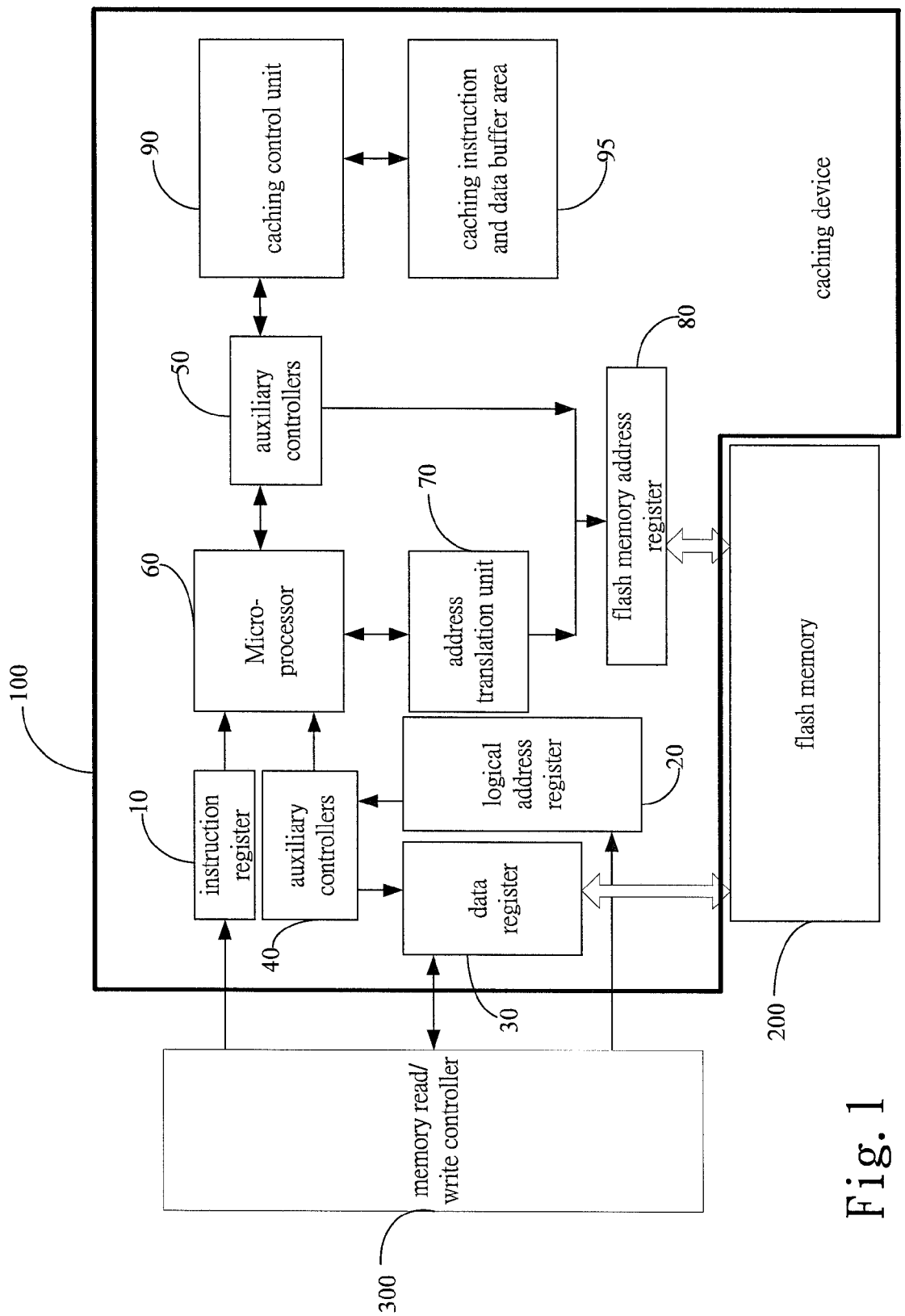
FIG. 1 is a schematic diagram showing a cashing device according to the present invention.

With reference to the drawings and in particular to FIG. 1, which is a schematic diagram showing a caching device, generally designated with reference numeral 100, according to the present invention, as illustrated, the caching device 100 is configured between a flash memory 200 and a memory read/write controller 300 that is one conventionally found in a flash memory card reader or in a card interface of a personal computer. The caching device 100 contains an instruction register 10, a logical address register 20, a data register 30, a pair of auxiliary controllers 40, 50, a microprocessor 60, an address translation unit 70, a flash memory address register 80, a caching control unit 90, and a caching instruction and data buffer area 95. The instruction register 10 connects the memory read/write controller 300 from which the instruction for reading or writing the flash memory 200 from the memory read/write controller 300 is received and temporarily stored.

The logical address register 20 also connects the memory read/write controller 300 from which the logical address for reading or writing the flash memory 200 from the memory read/write controller 300 is received and temporarily stored.

The data register 30 again connects the memory read/write controller 300 so that the data for writing into or reading from the flash memory 200 is temporarily stored.

The auxiliary controller 40 interfaces the data and logical address registers 30 and 20 with the microprocessor 60. The other auxiliary controller 50, on the other hand, interfaces the caching control unit 90 with the microprocessor 60. The auxiliary controllers 40, 50 assist the microprocessor in executing the instruction to read or write the flash memory 200.

In addition to the auxiliary controllers 40, 50, the microprocessor 60 connects the instruction register 10 and the address translation unit 70. The microprocessor 60 is the core of the caching device 100 which is responsible not only for the reading and writing the flash memory 200 but also for the caching operation for logical and physical address translation.

The address translation unit 70 is a memory device containing address mapping table (namely, a conventional block-level mapping mechanism) for the logical and physical addresses of the flash memory 200. The address translation unit 70 is limited to a particular type of memory device and, in the present embodiment, it is a random access memory (RAM).

The flash memory address register 80 interfaces the address translation unit 70 and the auxiliary controller 50 with the flash memory 200 for temporarily storing the physical address in accessing the flash memory 200.

The caching control unit 90 is also a programmable device containing the instruction and data for caching the logical and physical address mapping. The caching control unit 90 is not limited to a particular type of device and, in the present embodiment, it is a field-programmable gate array (FPGA). Other appropriate types of programmable device such as read-only memory (ROM) can also be used. The caching instructions are fed into the microprocessor 60 for execution and the obtained physical addresses are fed into the flash memory address register 80, both via the auxiliary controller 50.

The caching instruction and data buffer area 95 connects the caching control unit 90, and is a memory device for temporarily storing the caching instruction and data used by the caching control unit 90. Again, the caching instruction and data buffer area 95 is not limited to a particular type of memory device and, in the present embodiment, it is a RAM.

Figure 2:
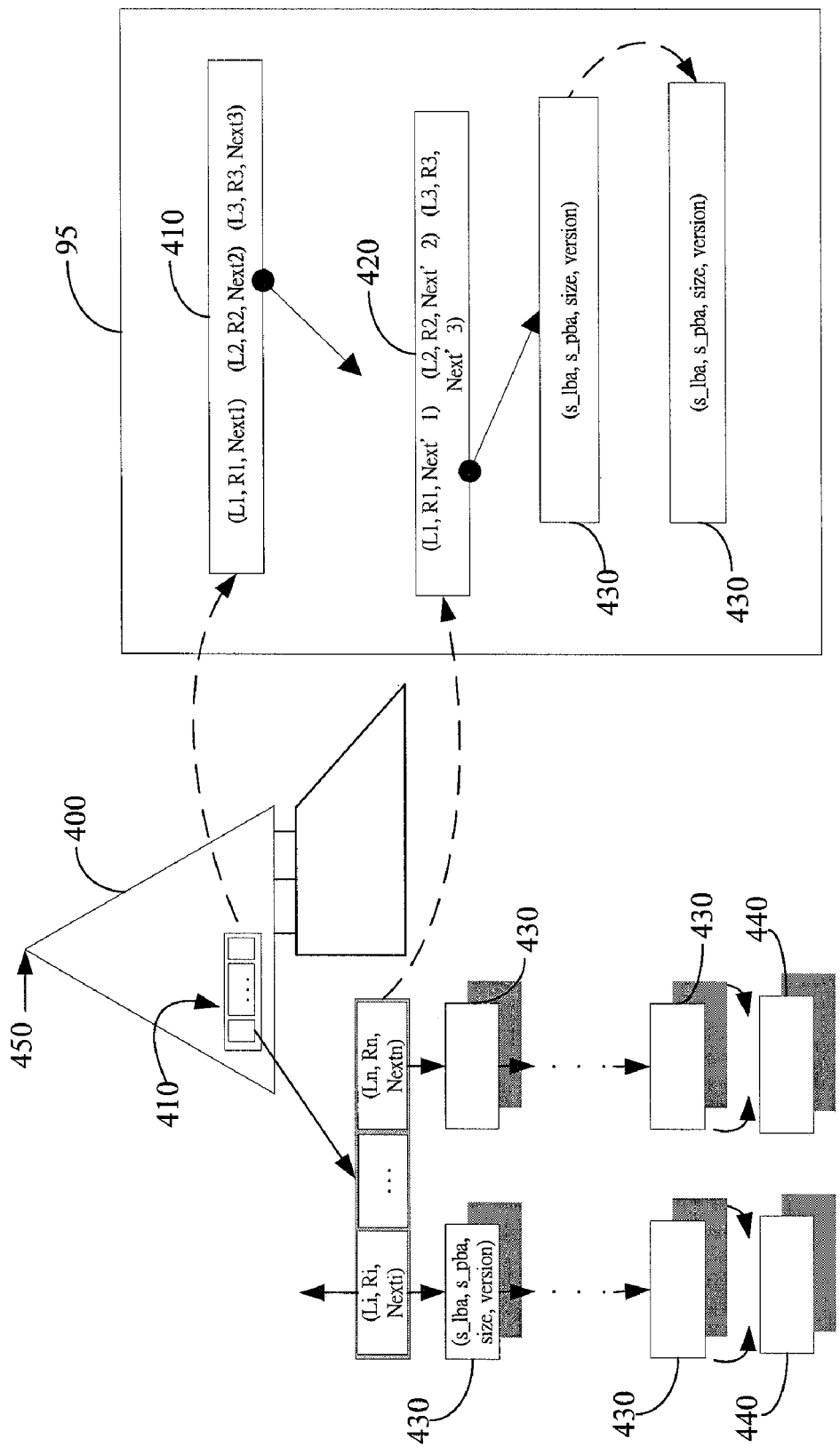
FIG. 2 is a schematic diagram showing a cashing mechanism according to the caching device of the present invention.

FIG. 2 is a schematic diagram showing a cashing mechanism according to the caching device 100 of the present invention. As illustrated, a search tree 400 is provided which contains a number of internal translation nodes 410 and external translation nodes 420, assuming that there are "n" internal translation nodes 410 and "n" external translation nodes 420. Each internal translation node 410 is assigned an attribute (Li, Ri, Nexti) where i=1 to n. The first and second attribute values Li and Ri specify the first and last logical addresses of a logical address range, respectively, and the third attribute value Nexti points to an external translation node 420 whose attribute's logical address range would fall within the range [Li, Ri] (namely, larger than or equal to Li but less than or equal to Ri). The internal translation nodes 410 are all within the search tree 400 while the external translation nodes 420 are the "leaves" of the search tree 400.

Each external translation node 420 is also assigned an attribute (Li, Ri, Next'i) where the attribute value Next'i points to a link list 440 of translation units 430. Each translation unit 430 within the link list 440 specifies a range of consecutive flash memory physical addresses corresponding to a range of consecutive logical addresses, which also fall within the external translation node 420's range [Li, Ri]. As shown in FIG. 2, each translation unit 430 is assigned an attribute (s_lba, s_pba, size, version) where the attribute value s_lba specifies the first logical address of the range of logical addresses, the attribute value s_pba specifies the first physical address of the range of the flash memory physical addresses, the attribute value size specifies the length of the range (namely, number of addresses), and the attribute value version is a timestamp of the translation unit 430.

To determine the physical address corresponding to a target logical address, the search tree 400 is traversed from the root 450, through a number of internal translation nodes 410, until an external translation node 420 is reached whose link list 440 contains a translation unit 430 covering the target logical address. The attribute of the translation unit 430 then can be used to obtain the physical address corresponding to the target logical address.

The search tree 400, the internal translation nodes 410, the external translation nodes 420, the translation units 430, the link lists 440, the root 450, and the caching instructions and data can be fixedly programmed in the caching control unit 90. The caching instructions and data are then executed by the microprocessor 60. The updated data and caching instructions can be temporarily stored in the caching instruction and data buffer area 95. The physical address obtained by the microprocessor 60 will be output to the flash memory address register 80 to access the flash memory 200. It is noted that, as there is limited space in the caching instruction and data buffer area 95, the logical addresses and their corresponding physical addressed can be purged to release their space for reuse if they are not used for a long period of time.

Figure 3:
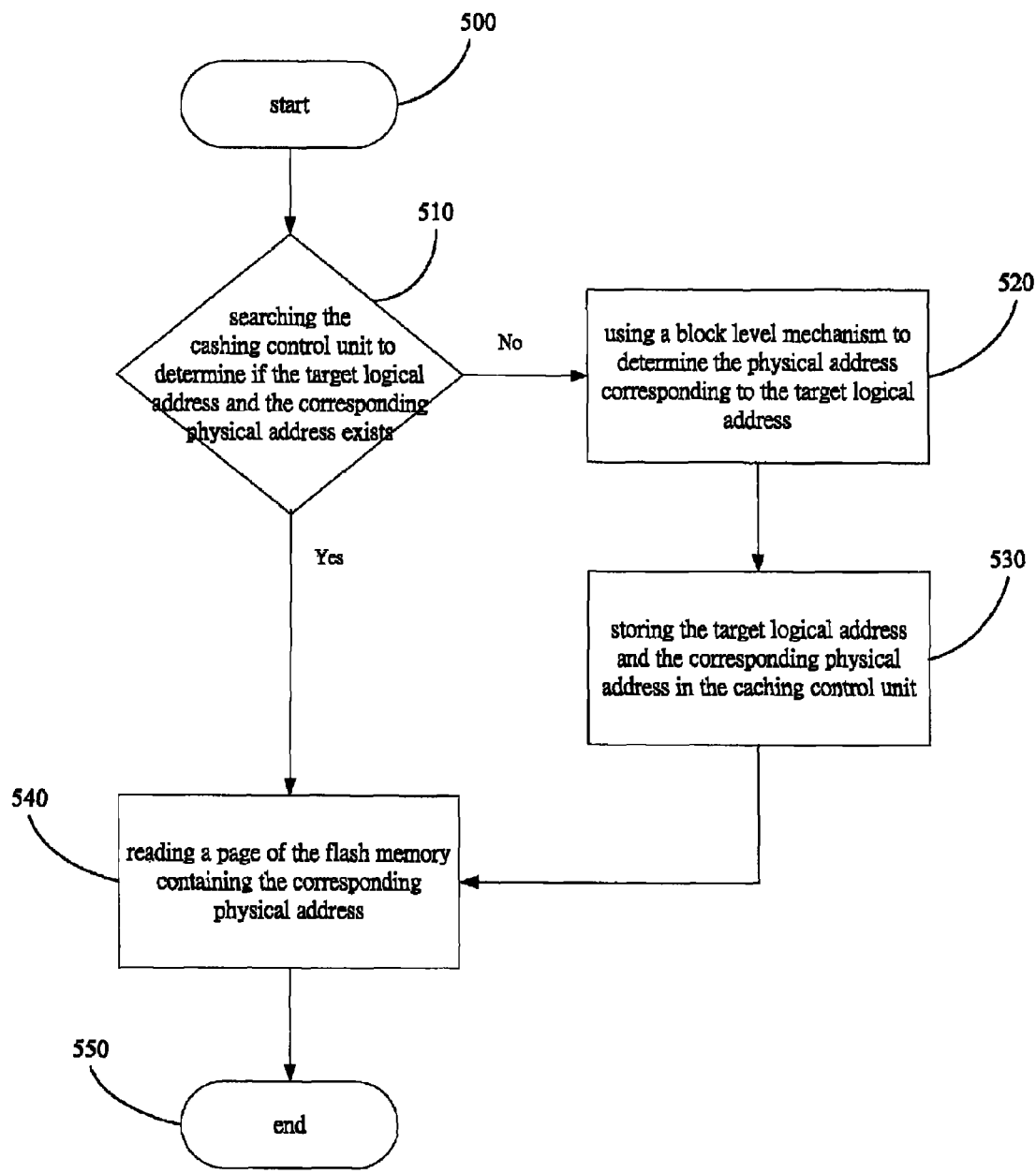
FIG. 3 is a flow diagram showing processing steps conducted by the caching device in read accessing a target logical address of a flash memory according to the present invention.

FIG. 3 is a flow diagram showing the processing steps conducted by the caching device 100 in read accessing a target logical address of the flash memory 200 according to the present invention. As illustrated, the processing steps 500 to 550 are as follows:

(500) starting;

(510) the cashing control unit 90 being searched to determine if the target logical address and the corresponding physical address exists (namely, by traversing the search tree 400); if yes, the process continues to step 540; otherwise the process continues to step 520;

(520) a block level mechanism being used to determine the physical address corresponding to the target logical address (namely, using the block-level mapping mechanism provided by the address translation unit 70);

(530) the logical address and the newly determined physical address being stored in the caching control unit 90;

(540) a page of the flash memory containing the determined physical address being read (namely, a page of the flash memory 200 is read by storing the physical address obtained by the microprocessor 60 through the address translation unit 70 or the auxiliary controller 50 into the flash memory address register 80); and (550) ending.

Figure 4:
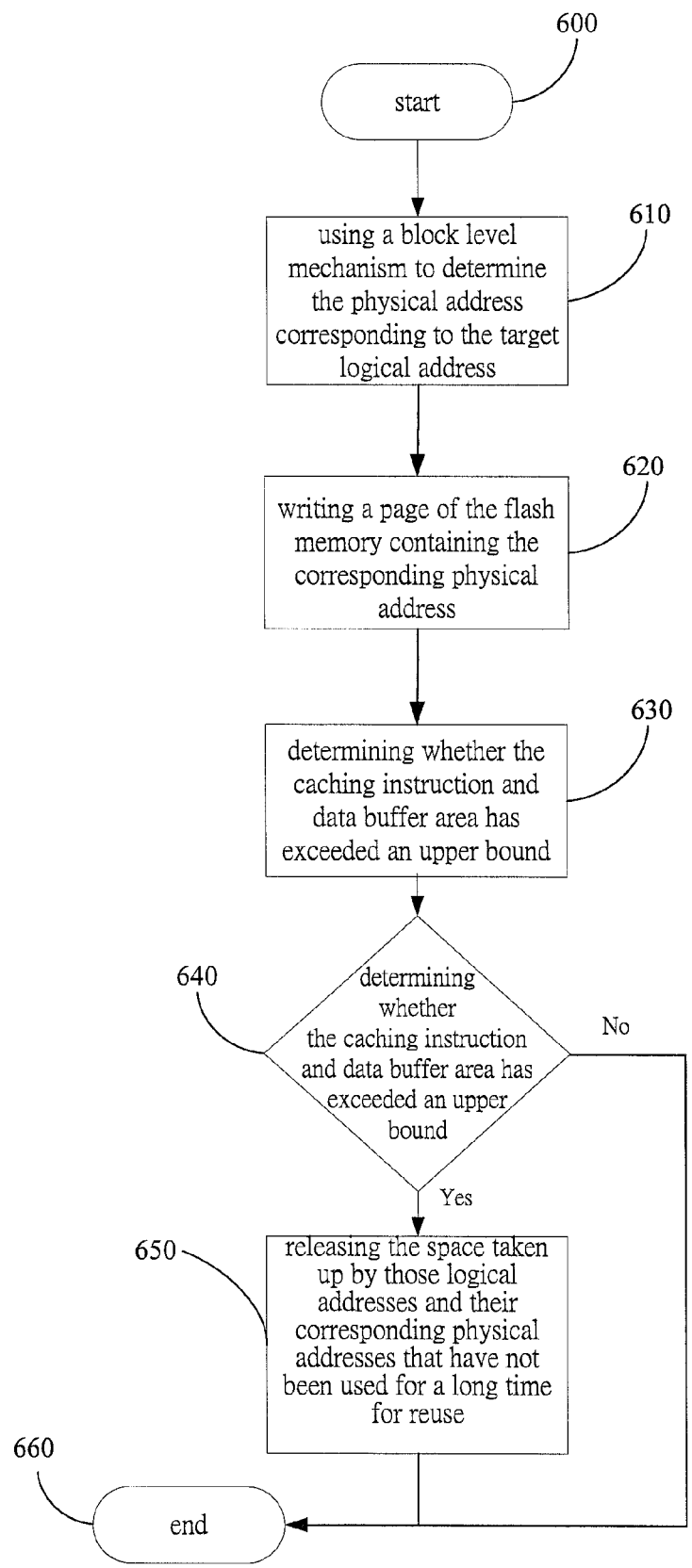
FIG. 4 is a flow diagram showing processing steps conducted by the caching device in write accessing a target logical address of a flash memory according to the present invention.

FIG. 4 is a flow diagram showing the processing steps conducted by the caching device 100 in write accessing a target logical address of the flash memory 200 according to the present invention. As illustrated, the processing steps 600 to 660 are as follows:

(600) starting;

(610) a block level mechanism being used to determine the physical address corresponding to the target logical address (namely, using the block-level mapping mechanism provided by the address translation unit 70);

(620) a page of the flash memory containing the determined physical address being written (namely, a page of the flash memory 200 is written by storing the physical address obtained by the microprocessor 60 through the address translation unit 70 or the auxiliary controller 50 into the flash memory address register 80);

(630) the logical address and the newly determined physical address being stored in the caching control unit 90;

(640) whether the caching instruction and data buffer area has been used up to an upper bound being determined; if yes, the process continues to step 650; otherwise, the process continues to step 660;

(650) the space taken up by those logical addresses that have not been used for a long time and their corresponding physical addresses being released for reuse, based on the version values of the translation units; and (660) ending.

Figure 5:
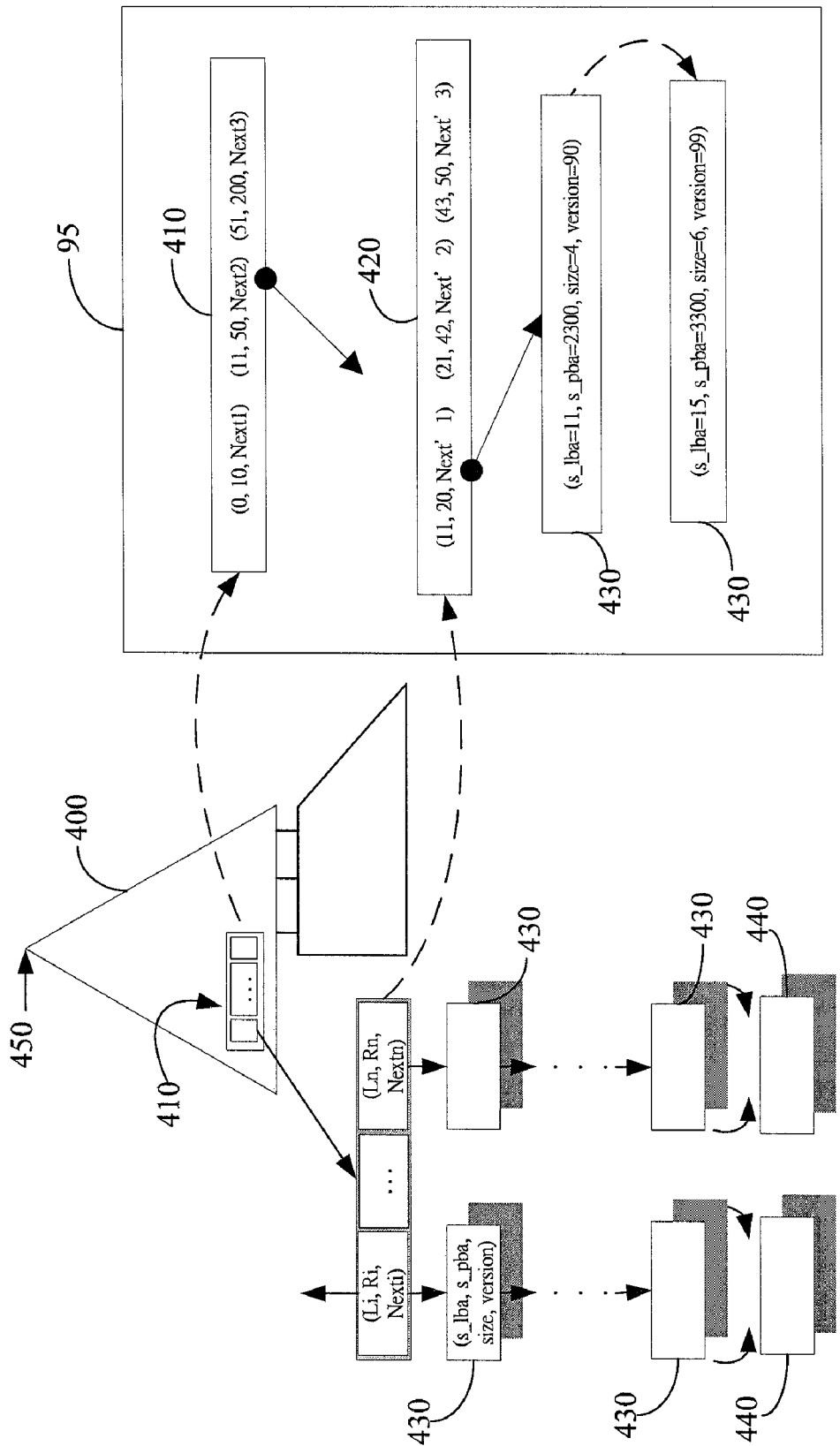
FIG. 5 is a schematic diagram showing an application scenario of the caching mechanism of FIG. 2.

FIG. 5 is a schematic diagram showing an application scenario of the caching mechanism of FIG. 2. This is to be used as an example illustrating how the data structures of the cashing device 100 are employed in the read or write accesses. For example, to obtain the physical address corresponding to a logical address 17, an internal translation node 410 having attributes [(0, 10, Next1), (11, 50, Next2), (51, 2000, Next3)] is found. Based on its attributes, the pointer Next2 is traversed to reach an external translation unit 420 having attributes [(11, 20, Next'1), (21, 42, Next'2), (43, 50, Next'3)]. Again, based on the attributes, the pointer Next'1 is traversed to reach a translation unit 430 having attribute (s_lba=15, s_pba=3300, size=6, version=99). Then, the corresponding physical address can be determined by following the formula (target logical address−s_lba+s_pba) which is equal to 3302 (17−5+3300). On the other hand, the version 99 can be used to determine whether the space taken up by those logical addresses and their corresponding physical addresses that have not been used for a long time should be released.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A caching device for NAND flash translation layer positioned between a memory read/write controller and a flash memory, comprising:
    an instruction register connecting the memory read/write controller from which the instruction for reading or writing the flash memory from the memory read/write controller is received and temporarily stored;
    a logical address register connecting the memory read/write controller from which the logical address for reading or writing the flash memory from the memory read/write controller is received and temporarily stored;
    a data register connecting the memory read/write controller so that the data for writing into or reading from the flash memory is temporarily stored;
    an address translation unit which is a memory device containing address mapping table for the logical and physical addresses of the flash memory;
    a microprocessor connecting the instruction register and the address translation unit responsible not only for the reading and writing the flash memory but also for the caching operation for logical and physical address translation;
    a caching control unit which is a programmable device containing the caching instruction and data for caching the logical and physical address mapping;
    a pair of auxiliary controllers where a first auxiliary controller interfaces the data and logical address registers with the microprocessor, and a second auxiliary controller interfaces the caching control unit with the microprocessor via which the caching instructions are fed into the microprocessor for execution;
    a flash memory address register interfacing the address translation unit and the second auxiliary controller with the flash memory for temporarily storing the obtained physical address in accessing the flash memory via the second auxiliary controller; and
    a caching instruction and data buffer area which is a memory device connecting the caching control unit for temporarily storing the caching instruction and data used by the caching control unit, wherein a caching mechanism established in the caching instruction and data buffer area comprises a search tree, an internal translation node, an external translation node, a translation unit, a link list, and a root, wherein the internal translation node is assigned a first set of attribute values, the external translation node is assigned a second set of attribute values, the first set of attribute values comprises a first parameter to point to the external translation node, and the second set of attribute values comprises a second parameter to point to a link list of the translation unit.

2. The caching device as claimed in claim 1, wherein the address translation unit is a random access memory.

3. The caching device as claimed in claim 1, wherein the caching control unit is a field-programmable gate array.

4. The caching device as claimed in claim 1, wherein the caching control unit is a read only memory.

5. The caching device as claimed in claim 1, wherein the caching instruction and data buffer area is a random access memory.

6. The caching device as claimed in claim 1, wherein the first set of attribute value comprises a first attribute value and a second attribute value.

7. The caching device as claimed in claim 6, wherein the first and second attribute values specify the first and last logical addresses of a logical address range, respectively.

8. The caching method as claimed in claim 1, wherein the second set of attribute value comprises a first attribute value and a second attribute value.

9. The caching device as claimed in claim 8, wherein the first and second attribute values specify the first and last logical addresses of a logical address range, respectively.

10. The caching device as claimed in claim 1, wherein each translation unit is assigned a third set of attribute value.

11. The caching device as claimed in claim 10, wherein the third set of attribute value comprises a fifth attribute value, a sixth attribute value, a seventh attribute value, and an eighth attribute value.

12. The caching device as claimed in claim 11, wherein the fifth attribute value specifies the first logical address of the range of logical addresses.

13. The caching device as claimed in claim 11, wherein the sixth attribute value specifies the first physical address of a range of the flash memory physical addresses.

14. The caching device as claimed in claim 11, wherein the seventh attribute value specifies the length of the range of the logical addresses.

15. The caching device as claimed in claim 11, wherein the eighth attribute is a timestamp of the translation unit.

* * * * *